US011265985B2

(12) United States Patent
Bakk

(10) Patent No.: US 11,265,985 B2
(45) Date of Patent: Mar. 1, 2022

(54) ILLUMINATION SYSTEM

(71) Applicant: TRIDONIC GMBH & CO KG, Dornbirn (AT)

(72) Inventor: Istvan Bakk, Torokbalint (HU)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 17/263,972

(22) PCT Filed: Jul. 17, 2019

(86) PCT No.: PCT/EP2019/069306
§ 371 (c)(1),
(2) Date: Jan. 28, 2021

(87) PCT Pub. No.: WO2020/025330
PCT Pub. Date: Feb. 6, 2020

(65) Prior Publication Data
US 2021/0307140 A1  Sep. 30, 2021

(30) Foreign Application Priority Data

Jul. 31, 2018 (EP) .................... 18186544

(51) Int. Cl.
H05B 45/22 (2020.01)
H05B 47/11 (2020.01)
(52) U.S. Cl.
CPC ............. H05B 45/22 (2020.01); H05B 47/11 (2020.01)
(58) Field of Classification Search
CPC ........ H05B 45/10; H05B 45/20; H05B 45/22; H05B 47/10; H05B 47/11
See application file for complete search history.

(56) References Cited

U.S. PATENT DOCUMENTS

| 2010/0182294 | A1* | 7/2010 | Roshan | G01J 3/505 345/207 |
| 2018/0224093 | A1* | 8/2018 | Dutta | A01G 7/045 |
| 2019/0254142 | A1* | 8/2019 | Petluri | G09G 3/2003 |

FOREIGN PATENT DOCUMENTS

| WO | 2007/004108 | 1/2007 |
| WO | 2007/060570 | 5/2007 |
| WO | 2009-031103 | 3/2009 |

OTHER PUBLICATIONS

International Search Report in parent PCT application PCT/EP2019/069306 dated Sep. 19, 2019.

* cited by examiner

Primary Examiner — Jimmy T Vu
(74) Attorney, Agent, or Firm — Andrus Intellectual Property Law, LLP

(57) ABSTRACT

The invention proposes an improved illumination system (1). The illumination system (1) comprises: an LED module (2) having at least one LED or OLED; at least one light sensor (3); and a control circuit (4) designed to control the current flowing through the LED module (2), and to be supplied with an individual sensing signal of each of the at least one light sensor (3). The at least one light sensor (3) is designed such that: the light sensor (3) has its sensitivity peak set to be at a lower wavelength than the spectrum emitted by the LED module (2), preferably below 420 nm, more preferably below 410 nm, and/or the light sensor (3) has its sensitivity peak set to be at a higher wavelength than the spectrum emitted by the LED module (2), preferably above 680 nm. Furthermore, the invention proposes a method for calibrating the illumination system (1). The control circuit (4) is designed to calculate a crosstalk calibration value, by detecting the contribution of a switching on or increasing of the current through the LED module (2) in (Continued)

a non-ambient light state, on the basis of the supplied detection signals.

14 Claims, 3 Drawing Sheets

ILLUMINATION SYSTEM

CROSS REFERENCE TO RELATED APPLICATIONS

The present application is the U.S. national stage application of international application PCT/EP2019/069306 filed Jul. 17, 2019, which international application was published on Feb. 6, 2020 as International Publication WO 2020/025330 A1. The international application claims priority to European Patent Application 18186544.5 filed Jul. 31, 2018.

FIELD OF THE INVENTION

The present invention relates to an illumination system.

BACKGROUND OF THE INVENTION

In the prior art, illumination systems with a light source, e.g. an LED (light emitting diode), and a light sensor, e.g. a daylight sensor, are well known. Such systems may be provided for adapting the illumination system to ambient light. For example, at higher ambient light levels such as daylight the illumination system is dimmed to a lower light output, whereas at lower ambient light levels such as sunset the illumination system is dimmed to a higher light output. For adapting the illumination system, usually spectral sensors using different filters are being used. The integration of such sensors is, however, highly limited by stray-light coming from the light source. Therefore, the detection of light being different from that coming from the light source (ambient light), e.g. natural light, in particular sun light, is rarely possible with these usually highly integrated (hidden) light sensors.

It is also known that for adapting the light with color-tunable light sources, a good detection of the ambient light intensity and CCT (correlated color temperature) is required. However, the natural light spectrum also depends on the room/building to illuminated, in particular the direction of windows, shaders, and other shading objects in the room/building. For the reason of the good detection of the ambient light intensity and CCT, the light sensor is thus preferably located in the vicinity of the light source. This, however, increases the effect of stray-light coming from the light source to the light sensor.

In the light of the above, there is thus the challenge of eliminating or at least reducing the effect of the light-source on the light sensor, while providing a good detection of the ambient light intensity and CCT.

Therefore, it is an object of the present invention to provide an illumination system, which overcomes the aforementioned drawbacks. In particular, it is an object of the present invention to provide an illumination system, which more easily and reliably adapts to ambient light, in particular ambient light intensity and color temperature (e.g., sunrise, sunset, clear weather, overcast).

These and other objects, which become apparent upon reading the following description, are solved by the subject-matter of the independent claims. The dependent claims refer to preferred embodiments of the invention.

SUMMARY OF THE INVENTION

According to the invention, an illumination system comprises: an LED module having at least one LED or OLED, at least one light sensor, and a control circuit designed to control the current flowing through the LED module and to be supplied with an individual sensing signal of each of the at least one light sensor. The light sensor is designed such that: the light sensor has its sensitivity peak set to be at a lower wavelength than the spectrum emitted by the LED module, preferably (violet) below 420 nm, more preferably below 410 nm, and/or that the light sensor has its sensitivity peak set to be at a higher wavelength than the spectrum emitted by the LED module, preferably above red or 680 nm.

In other words, the present invention proposes to provide an illumination system with a light sensor being designed such that the light sensor senses substantially only wavelengths of light being outside of the spectrum emitted by LED module. That is, substantially all wavelengths of the spectrum emitted by the LED module, preferably 80% to 100%, more preferably 90% to 99%, most preferably 95% to 98% of the LED module's spectral power distribution or emitted visible light, cannot be sensed by the light sensor. In other words, only 0% to 20%, preferably 1% to 11%, more preferably 2% to 5% of the light sensed by the light sensor contributes to the light emitted by the LED module. Therefore, the negative effect of the stray light of the LED module on controlling the LED module is eliminated or at least reduced. Thus, since substantially only ambient light is sensed by the light sensor, the illumination system can be used in a variety of different locations and can more easily and reliably be adapted to different ambient light situations. In the context of the invention, "ambient light" is preferably to be understood as artificial and/or natural light originating from a light source other than the LED module with the light sensor itself, e.g. artificial and/or natural light being reflected by illuminated objects and/or coming directly to the light sensor.

For example in ambient light situations such as sunrise, sunset, clear weather, overcast or any other filtering condition by the atmosphere, the illumination system thus emits the desired light for the respective situation; deviations from this desired light emission are eliminated or at least significantly reduced due to elimination or at least reduction of the negative effect of the stray-light of the LED module on the control of the LED module.

Preferably, the illumination system comprises at least two light sensors. At least one light sensor of the at least two light sensors has its sensitivity peak set to be at the lower wavelength, i.e. a wavelength lower than the spectrum emitted by the LED module, preferably (violet) below 420 nm, more preferably below 410 nm. The other at least one light sensor of the at least two light sensors has its sensitivity peak set to be at the higher wavelength, i.e. a wavelength higher than the spectrum emitted by the LED module, preferably above 680 nm, more preferably above 690 nm or 700 nm. In particular, this provides better flexibility for locating the light sensors with respect to the LED module, since the light sensor with the sensitivity peak set to be at the lower wavelength is structurally decoupled from the light sensor with the sensitivity peak set to be at the higher wavelength. Further, the at least two light sensors provide more channels (or bands) for spectral identification, so that more different wavelengths can be detected by the at least two light sensors, thus providing a higher accuracy in filtering the stray light from the LED module.

The LED module may comprise a color converted LED. Thus, an easy way of emitting light of a specific wavelength by the LED is effected for adapting the illumination system to the ambient light.

Preferably, the at least one light sensor has a FWHM (Full Width at Half Maximum) of between 10 nm and 30 nm. The function, for which the FWHM is indicated, is the intensity of the respective signal depending on the wavelength of the light reaching the light sensor; at function has a maximum at a particular wavelength. In other words, each of the at least one light sensor may include at least one channel (or band) for spectral identification of the light wavelengths, wherein each of the channels has a FWHM (bandwidth) of between 10 nm and 30 nm. More preferably the FWHM is between 15 nm and 25 nm. In a preferred example the FWHM is about 20 nm.

The control circuit may be designed to detect the CCT and/or the intensity of the sensed light on the basis of the at least one supplied sensing signal. Therefore, an easy way of detecting the CCT and/or the intensity of the sensed light is provided. With the CCT and/or the intensity of the sensed light the light emitted by the LED module can thus be adapted to the respective ambient light.

The control circuit may be designed to control the current through the LED module as a function of the detected CCT and/or intensity. Therefore, in particular the intensity and/or the CCT of the light emitted by the LED module can be varied in accordance to the detected CCT and/or intensity.

Preferably, the CCT is detected taking into account the relative intensity values of the sensing signals. The relative intensity values may be a value of one channel of the light sensor relative to a value of another channel of the light sensor. Thus, an easy way for detecting the CCT of the ambient (natural) light is provided. By taking this detection into account, also the type of the ambient light, e.g. sunset, sunrise, clear or overcast, can be determined.

The illumination system is preferably part of a luminaire.

Preferably, the control circuit is designed to change the CCT and/or the spectrum emitted by the LED module. As such, the control circuit can control the LED module to emit light being adapted for the respective ambient light. For example, in an environment with a darker ambient light, the CCT may be changed to a cooler temperature.

The control circuit may be functionally connected with a storage device in which LED stray light values are stored associated with at least one operation parameter for the LED module, the LED stray light values indicating the contribution of the LED emission on the sensing signals. Therefore, the effect of the stray light of the LED module on controlling the LED module can be further reduced.

The operation parameter may be one or more of LED current, LED voltage and temperature.

A luminaire may be provided with the above described illumination system.

According to a further aspect of the invention, a method for calibrating a system as described above is provided. The control circuit is designed to calculate a crosstalk calibration value, by detecting the contribution of a switching on or increasing of the current through the LED module in a non-ambient light state, on the basis of the supplied detection signals.

The non-ambient light state, e.g. a dark room, provides an environment in which no ambient light but only light emitted by the LED is present. When the LED module emits light, light being sensed by the at least one light sensor is thus stray light emitted by the LED module only, i.e. light of the LED module reaching the at least one light sensor. Therefore, the at least one light sensor will supply detection signals being representative of this stray light for calculating a crosstalk calibration value or stray light intensity. Taking this crosstalk calibration value, the at least one light sensor can be adapted accordingly, in particular such that the sensitivity peak set(s) of the at least one light sensor is/are at a lower wavelength and/or at a higher wavelength than the spectrum emitted by the LED module. Therefore, the negative effect of stray light on controlling the LED module can be eliminated or at least reduced.

BRIEF DESCRIPTION OF THE DRAWINGS

In the following, the invention is described exemplarily with reference to the enclosed figures, in which.

DETAILED DESCRIPTION

Specific embodiments of the present invention are described in the following. Embodiments can be combined with each other, where they do not contradict. Individual features characterizing one embodiment can also be implemented in another embodiment.

Figure 1:
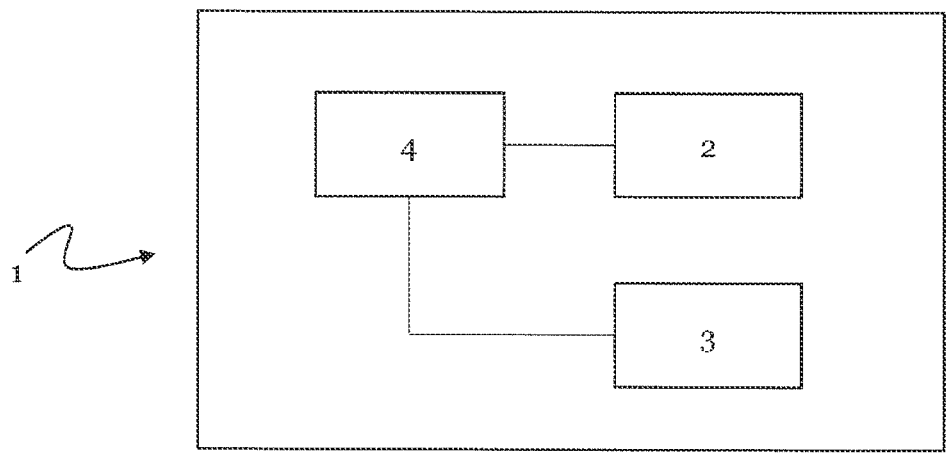
FIG. 1 is a schematic view of an illumination system according to a first embodiment of the present invention.

FIG. 1 schematically shows an illumination system 1 according to a first embodiment of the present invention. The illumination system 1 is operable based on (e.g. ambient) light sensing. The illumination system 1 may be part of a luminaire, e.g. integrated in a downlight, a panel light or a retrofit lamp. The illumination system 1 may be used in an environment (e.g. in a room, a house, an office) for adapting the light (e.g. the light of the luminaire), to a specific ambient light. In particular, at higher ambient light levels (e.g. at daylight) the illumination system 1 may be dimmed to a lower light output, whereas at lower ambient light levels, the illumination system 1 may be dimmed to a higher light output. Additionally or alternatively, the illumination system 1 may also change the CCT (correlated color temperature) of the light being output by the illumination system 1 in accordance with the ambient light. The illumination system 1 is driven by electrical energy and, thus, may comprise a power input such as a power plug.

The illumination system 1 has an LED module 2 with at least one LED (light emitting diode) and/or OLED (organic light emitting diode). The LED module 2 may comprise a color converted LED. For example, the color converted LED may be covered with a color conversion material such as phosphor. As such, a fraction of the light emitted by the LED undergoes the Stokes shift, which transforms it from shorter wavelengths to longer wavelengths. Therefore, various colors can be effected depending on the original LED's color, e.g. blue light being emitted by the LED may be transformed by the color conversion material (phosphor) to yellow light. The LED module 2 advantageously comprises a color-tunable light source. The color-tunable light source may have at least two independently controllable LED strings with different CCT. As such, the CCT of the light being emitted by the LED module 2 can be easily varied, e.g. for adapting the illumination system 1 to a specific ambient light.

The illumination system 1 further comprises at least one or a single light sensor 3. The light sensor 3 is preferably a light sensor being adapted for spectral identification of light wavelengths and/or for identification of the intensity of the respective wavelength. For example, the light sensor 3 may be adapted for differentiating between several wavelengths or ranges of wavelengths, e.g. between six, twelve or 18 wavelength (ranges). The light sensor 3 is preferably adapted to differentiate between one or more of the following wavelengths of light: 410 nm, 435 nm, 460 nm, 485 nm, 510 nm, 535 nm, 560 nm, 585 nm, 610 nm, 645 nm, 680 nm, 705 nm, 730 nm, 760 nm, 810 nm, 860 nm, 900 nm, 940 nm. The light sensor 3 therefore generates an individual signal representative of the respective wavelength. In a range around the respective wavelength, the respective signal preferably varies according to a function having a maximum value at a specific wavelength, e.g. at one of the above wavelengths. Said function preferably has a FWHM (full width at half maximum) of between 10 nm and 30 nm, preferably between 15 nm and 25 nm, more preferably about 20 nm.

The light sensor 3 may include a plurality of channels or bands, each being adapted for identifying one of the wavelengths or ranges of wavelengths. Such sensors are also known as multiple narrow band sensors and are of low costs. The respective channel may comprise a respective photodiode being designed to generate an electrical current or voltage, (only) when light of the respective wavelength reaches the photodiode.

The illumination system 1 further comprises a control circuit 4. The control circuit 4 is an electronic control circuit, e.g. a microcontroller. The control circuit 4 is designed to control the current (driving current) flowing through the LED module 2, the at least one LED, respectively. The control circuit 4 preferably functions as a drive for the LED module 2. For example, the LED module 2 can be driven by the control circuit 4 with a pulse modulated signal, e.g. a PWM signal. By changing the amplitude or pulse width of the pulse modulated signal, for instance by either changing the on-period or the off-period or both periods of the pulse modulated signal, the light output/intensity of the LED module 2 can be varied.

The control circuit 4 is further designed to be supplied with an individual sensing signal of each of the at least one light sensor 3. As such, the control circuit 4 is functionally connected to the light sensor 3. In particular, the control circuit 4 is configured to receive a sensed signal provided by the at least one light sensor 3, and to control a light output/light emission intensity of the LED module 2 based on the received and preferably evaluated sensed signal. In other words, the control unit 4 is configured to at least dim and/or change the color of the one or more emitting LED module 2 based on the intensity of sensed ambient light by the at least one light sensor 3. The sensed signal may be obtained in different ways by the control circuit 4. The sensed signal may be a current measurement on the at least one light sensor 3, having negative, positive or zero bias. Alternatively, a voltage at the at least one light sensor 3 measured over a given resistive load may be taken as the sensed signal. Alternatively, a voltage change measurement performed on a defined regular bases/or in a certain time period may be used.

Figure 6:
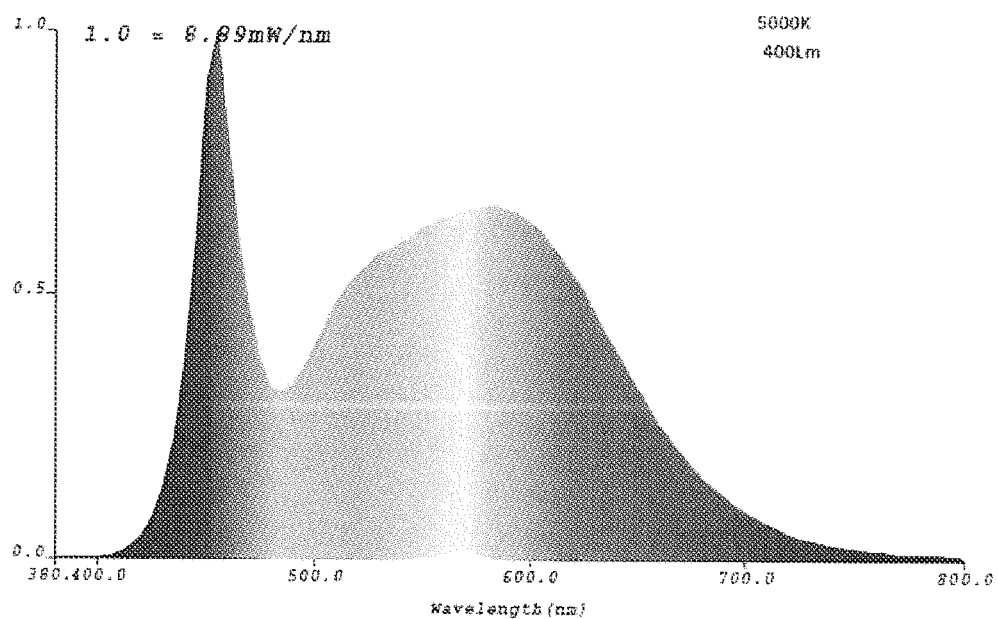
FIG. 6 is a diagram exemplarily showing the spectral power distribution of an LED module or an LED.

According to the invention, the light sensor 3 is designed such that the light sensor 3 has its sensitivity peak set to be at a lower wavelength than the spectrum emitted by the LED module 2, preferably (violet) below 420 nm or below 420 nm, more preferably below 410 nm. The sensitivity peak set of the light sensor 3 comprises those wavelengths, which the light sensor 3 can sense or identify. In other words, only those wavelengths which the light sensor 3 can measure or identify constitute the sensitivity peak set. FIG. 6 exemplarily shows a spectrum emitted by the LED module 2. The spectrum essentially ranges from 410 nm to 680 nm, i.e. 95% or 98% of the spectral power distribution lies within the range from 410 nm to 680 nm. In order to measure only the wavelengths lower than the spectrum emitted by the LED module 2, the light sensor 3 may be designed such that the sensitivity peak set of the light sensor 3 comprises only channels for sensing wavelengths lower than the spectrum emitted by the LED module 2.

Looking exemplarily at FIG. 4, the light sensor 3 may thus have a single channel, namely a channel being adapted for identifying the wavelength of 410 nm or a wavelength below 410 nm, for having the sensitivity peak set to be at a lower wavelength than the spectrum emitted by the LED module 2. However, the light sensor 3 may also have a plurality of channels, each being at or below the wavelength of 410 nm, for having the sensitivity peak set to be at a lower wavelength than the spectrum emitted by the LED module 2. As such, the light sensor 3 substantially measures only light other than the light being emitted LED module 2. This is advantageous for adapting the illumination system 1 to the respective ambient light, since the light being emitted by the LED module 2 does not affect the adaption to the respective ambient light anymore.

Figure 5:
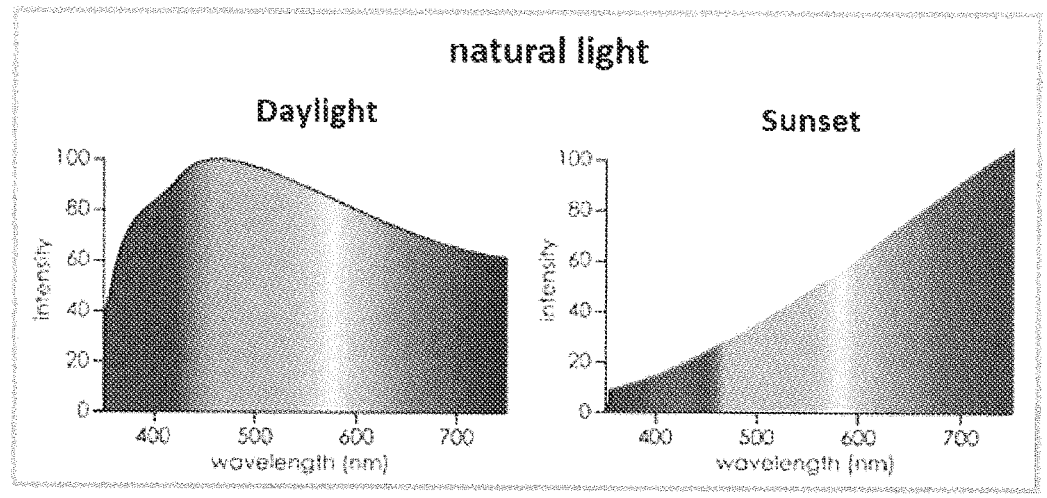
FIG. 5 is a diagram exemplarily showing the spectral power distribution of natural light during daylight and sunset.

The aforementioned effect may be exemplified when comparing FIG. 5 with FIG. 6. FIG. 5 exemplarily shows the wavelengths and the respective intensities of natural light, namely at daylight and sunset. In FIG. 6, in the range from 0 nm to 410 nm substantially all wavelengths of this range have no or a very low intensity. In FIG. 5 it is shown that the natural light in said range of wavelengths has a substantially higher intensity than the light emitted by the LED module 2. When the light sensor 3 is adapted for sensing in the range of 0 nm to 410 nm only, the light sensor 3 thus senses substantially only ambient light.

Alternatively or additionally, the light sensor 3 is (further) designed such that the sensitivity peak set is also at a higher wavelength than the spectrum emitted by the LED module 2, preferably above 680 nm, more preferably above 690 nm, or preferably above 700 nm. In order to measure only the wavelengths above the spectrum emitted by the LED module 2, the light sensor 3 may be designed such that the sensitivity peak set of light sensor 3 comprises only channels for sensing wavelengths above the spectrum emitted by the LED module 2.

Figure 4:
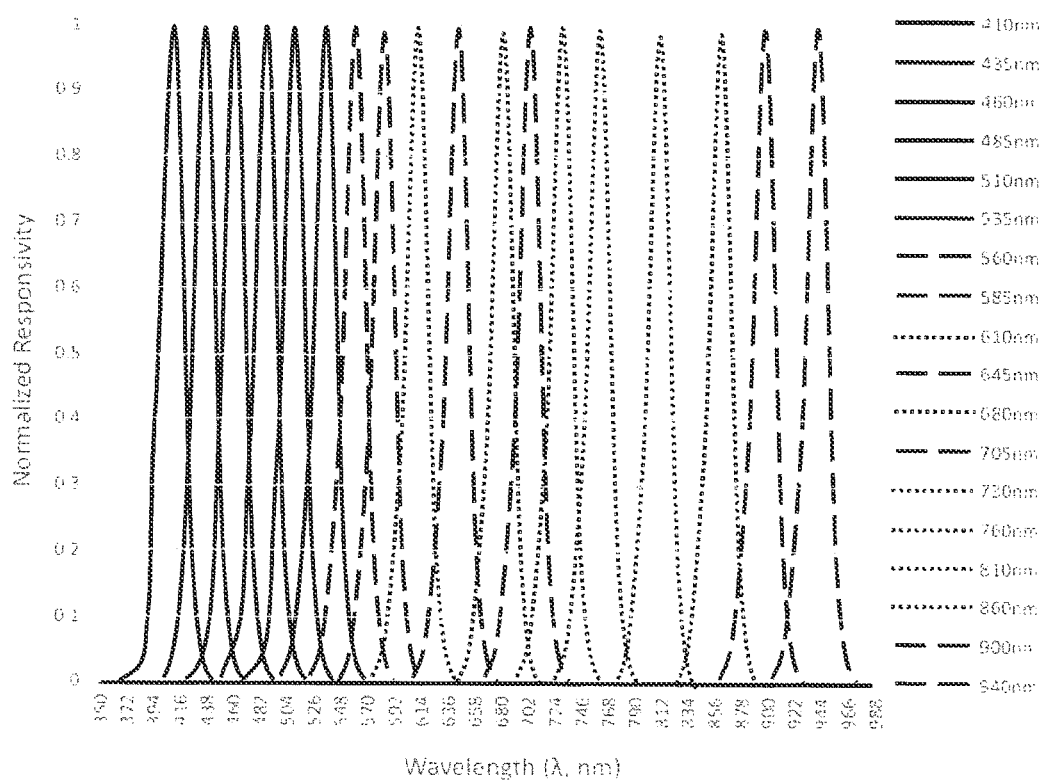
FIG. 4 is a diagram of preferred light sensors with 18 channels in total showing the spectral responses of the respective channels.

For identifying the wavelengths above the spectrum emitted by the light sensor 3, the light sensor 3 may thus have a single channel, e.g. a channel being adapted for identifying the wavelength of 705 nm, or a plurality of channels, in particular one, two, more or all of the channels being adapted for identifying the wavelength of 705 nm, 730 nm, 760 nm, 810 nm, 860 nm, 900 nm, 940 nm, respectively (see FIG. 4). In a preferred embodiment, only the channels from 760 nm to 940 nm are used. As such, the light sensor 3 substantially measures only light other than the light being emitted LED module 2. This is advantageous for adapting the illumination system 1 to the respective ambient light, since the light being emitted by the LED module 2 does not affect the adaption of the illumination system 1 to the respective ambient light anymore. In particular when the light sensor 3 is designed such that the sensitivity peak set is both at a lower and a higher wavelength than the spectrum emitted by the LED module 2, a better sensitivity and a larger noise ratio is achieved, thereby also effecting a better robustness of controlling the light output of the illumination system 1.

The aforementioned effect may be also exemplified when comparing FIG. 6 with FIG. 5. In FIG. 6, in the range of preferably above 680 nm, 690 nm or 700 nm and above substantially all wavelengths of this range have no or a very low intensity. In FIG. 5 it is shown that the natural light in said range of wavelengths has a substantially higher intensity than the light emitted by the LED module 2. When the light sensor 3 is adapted for sensing in the range of 0 nm to 410 nm and/or in the range of 705 nm and above only, the light sensor 3 thus senses substantially only ambient light.

Figure 2:
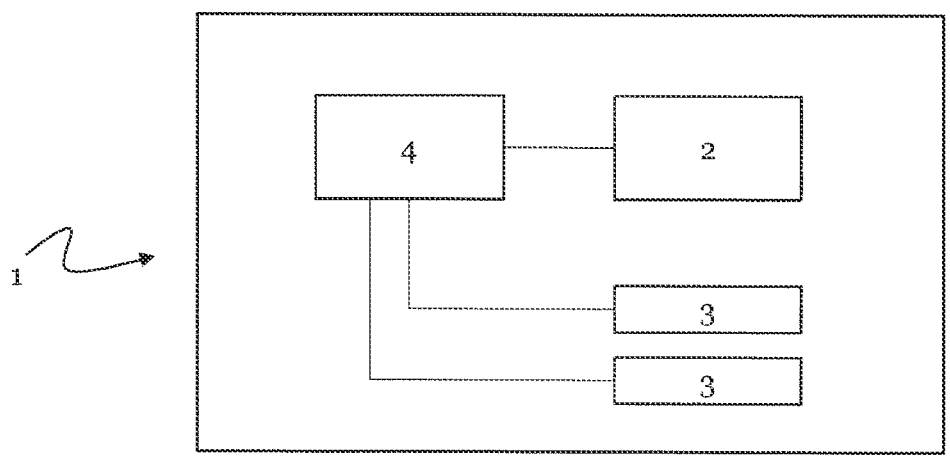
FIG. 2 is a schematic view of an illumination system according to a second embodiment of the present invention.

FIG. 2 shows the illumination system 1 according to a second preferred embodiment, which instead of a single light sensor 3 comprises at least two or only two light sensors 3. In this preferred embodiment, the aforementioned sensitivity peak sets are therefore not provided on a single light sensor 3, but distributed among the at least two light sensors 3. In a particularly preferred embodiment, one of the light sensors 3 has the sensitivity peak set being at a or the lower wavelength than the emission spectrum of the LED module 2, wherein the other one of the light sensors 3 has the sensitivity peak set being at a higher wavelength than the emission spectrum of the LED module 2. The aforementioned advantageous effects with respect to controlling the light output of the illumination system 1 thus apply likewise for this embodiment. Further, with such a configuration a greater flexibility of sensing ambient light is provided, in particular since the plurality of channels is more easily provided by interconnecting the at least two light sensors.

The present invention is, however, not limited to a specific number of light sensors 3. In particular, the illumination system 1 may also comprise three or more light sensors 3. The sensitivity peak sets (all of which are substantially outside of the spectrum emitted by the LED module 2) are then distributed among these light sensors 3. For example, three light sensors 3 may be provided such that a first light sensor has the channel with the wavelength of 410 nm, a second light sensor has one, a plurality or all of the channels with the wavelengths of 705 nm, 900 nm, 940 nm, and a third light sensor has one, a plurality or all of the channels with the wavelengths of 730 nm, 760 nm, 810 nm, 860 nm (see, e.g., FIG. 4).

Figure 3:
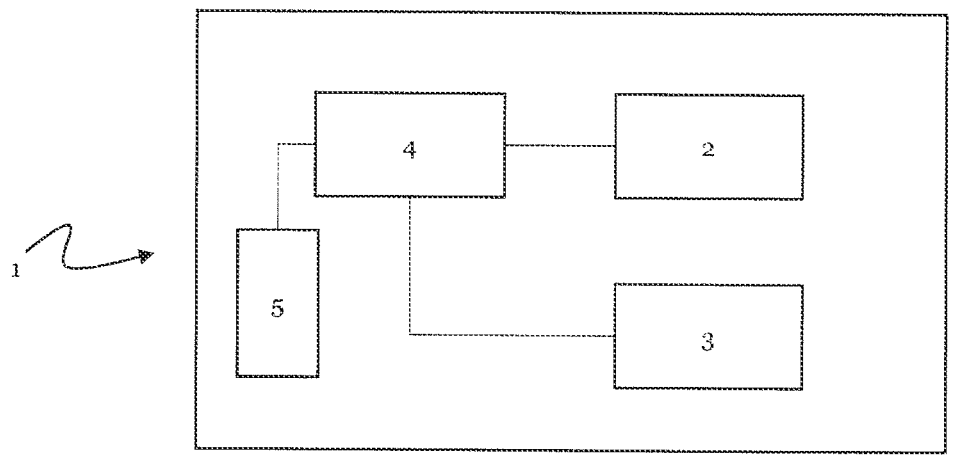
FIG. 3 is a schematic view of an illumination system according to a third embodiment of the present invention.

As exemplarily shown in FIG. 3, the illuminations system 1 may further comprise a storage device 5 in which LED stray light values are stored. The storage device 5 is functionally connected with the control circuit 4, so that the control circuit 4 can control the LED module 2 on the basis of the LED stray light values. The LED stray light values are associated with at least one operation parameter for the LED module 2. The operation parameter may be one or more of LED current, LED voltage and temperature. The LED stray light values indicate the contribution of the LED emission on the sensing signals. For example, for the sensed wavelength of 680 nm, 690 nm or 700 nm the intensity of the wavelength may still include a contribution of the LED emission, since the sensitivity peak set of the light sensor 3 overlaps with the spectrum of the LED emission. Based on the stray light value for this wavelength, the control circuit 4 calculates the parameters, in particular the intensity, of the actual ambient light and accordingly sets the operation parameter, e.g. for increasing the intensity of the light output of the LED module 2.

Furthermore, the control circuit 4 may be designed to detect the CCT and/or the type of the ambient light (sunset, sunrise, clear, overcast or any other (naturally) filtered natural light) on the basis of at least two supplied sensing signals being provided by the at least one light sensor 3. It was found that the different natural light conditions give a "fingerprint" on the different spectral channels of the light sensor 3. In particular, it was found that a significant change on the fingerprints is seen on the violet/red and infrared spectral parts. Also the red-near infrared part gives useable information about the CCT and/or the type of the ambient light.

More specifically, the control circuit 5 may detect the CCT and/or the type of the ambient light by taking into account relative intensity values of the sensing signals. In one example, the intensity values of different-waved wavelengths of the sensed light are compared, e.g. the intensity of the short-waved wavelengths (in particular below 410 nm or 420 nm, e.g. the violet spectral part) with the intensity of the long-waved wavelengths (in particular above 680 nm, preferably above 690 nm or 700 nm, e.g. the red and infrared spectral parts). For example, when the at least one light sensor 3 senses an intensity of the higher or long-waved wavelengths (e.g. 680 nm, 690 nm or preferably above 700 nm and above) being higher than the intensity of the lower or short-waved wavelengths (e.g. below 410 nm or 420 nm), the control circuit determines a warm CCT and/or the type of the ambient light being sunset. Accordingly, the control circuit 5 may control the current through the LED module 2 as a function of the detected CCT. With respect to the example in which a warm CCT is detected, the control circuit 5 may thus control the LED module 2 such that the contribution of blue light is increased, so that the CCT becomes cooler, e.g. for the purpose of office work.

Alternatively or additionally, the control circuit 5 may be designed to detect the intensity of the sensed light on the basis of the at least two supplied sensing signals. This may be also performed by comparing the intensity values of different-waved wavelengths, e.g. comparing the intensity of the short-waved wavelengths with the intensity of the long-waved wavelengths. For example, when the at least one light sensor 3 senses an intensity of the higher or long-waved wavelengths (e.g. above 680 nm, 690 nm or preferably 700 nm and above) being higher than the intensity of the lower or short-waved wavelengths (e.g. below 410 nm or 420 nm), the control circuit determines a low intensity of the ambient light, which may be during sunset.

Accordingly, the control circuit 5 may control the current through the LED module 2 as a function of the detected intensity of the ambient light. With respect to the example in which a low intensity of the ambient light is detected, the control circuit 5 may thus control the LED module 2 such that the LED module 2 has a higher light output, so that the intensity of the ambient light in the respective illuminated area is increased.

Due to the design of the light sensor 3, the light sensor 3 can thus be located in the vicinity of the LED module 2. Thereby, the LED module 2 and the at least one light sensor 3 can be integrated in one another, e.g. provided in a single housing (part). Furthermore, also the control circuit 4 and/or the storage device 5 may be integrated with the LED module 2 and/or the at least one light sensor 3, e.g. provided in the single housing. Therefore, a very compact illumination system 1 can be provided.

A method for calibrating the illumination system 1 as described above is described in the following.

For calibrating the illumination system 1, the illumination system 1 is provided in a non-ambient light state, e.g. in a dark room. In the non-ambient light state, light which reaches the light sensor 3 is thus emitted by the LED module 2 only. When the illumination system 1 or at least the LED module 2 is switched on or at least a current through the LED module 2 is increased, the LED module 2 outputs light or more light, thus, changing the amount of light reaching the light sensor 3. Preferably, the LED module 2 is switched on and tested along the (whole) dimming range of the LED module 2. The light sensor 3 will thus supply detection signals, which in turn will be forwarded to the control circuit 5. The control circuit 5, e.g. switched in a calibration mode, will take these supply detection signals to calculate a crosstalk calibration value. The crosstalk calibration value may comprise intensity and/or wavelength(s) of the light sensed by the light sensor 3, which is stray light of the light sensor 3 only. Taking into account the crosstalk calibration value, the control circuit 5 may adapt the illumination system 1. Said adaption may include adapting the LED stray light values on the storage device 5 and/or adapting the light sensor 3, e.g. deactivating channels of the light sensor 3 which have a wavelength that lies in the range of the wavelength(s) of the calibration value.

The illumination system 1 may be adapted for switching between a calibration mode and an operating mode, wherein in the calibration mode the control circuit 4 (only) calibrates the illumination system 1 as described above. In the operation mode, the control circuit 4 is operable for adapting the light output of the illumination system 1 to the ambient light. Preferably, the illumination system 1 is adapted to automatically switch from the operation mode into the calibration mode, e.g. when a non-ambient light state, in particular a dark environment, is detected. Correspondingly, the illumination system 1 may automatically switch from the calibration mode into the operation mode, e.g. when an ambient light state is detected.

Calibrating the illumination system 1 in a non-ambient light environment (e.g. in a dark room) as stated above provides several advantages such as compensation for extra back-reflections, aging and other parameters of the light sensor 3. With the automatic switching between the operation mode and the calibration mode, such a calibration may be easily performed by simply switching on the illumination system 1 in a non-ambient light environment such as a dark room.

It should be clear to a skilled person that the embodiments shown in the figures are only preferred embodiments, but that, however, also other designs of illumination system can be provided.

What is claimed is:

1. An illumination system (1) comprising:
   an LED module (2) having at least one LED or OLED,
   at least one light sensor (3) having one or more sensor channels and a sensitivity peak set, and
   a control circuit (4) designed to control the a current flowing through the LED module (2), and to be supplied with an individual sensing signal of each of the at least one light sensor (3);
   wherein the at least one light sensor (3) is designed such that:
   the sensitivity peak set for the at least one light sensor (3) is selected to detect only at wavelengths at 420 nm and below or at 680 nm and above, such that no more than 20% of a spectral power distribution of the LED module is detected by the at least one light sensor.

2. The system (1) according to claim 1, wherein the at least one light sensor (3) is further designed such that the light sensor (3) has sensitivity peak set to detect wavelengths at 410 nm or below.

3. The system (1) according to claim 1, further comprising at least two light sensors (3), wherein at least one light sensor (3) of the at least two light sensors (3) has its sensitivity peak set to be at a lower wavelength than a spectrum emitted by the LED module (2), and wherein at least another one of the at least two light sensors (3) has sensitivity peak set to be at a higher wavelength than the spectrum emitted by the LED module (2).

4. The system (1) according to claim 1, wherein the LED module (2) comprises a color converted LED.

5. The system (1) according to claim 1, wherein the at least one light sensor (3) has a FWHM of between 10 nm and 30 nm.

6. The system (1) according to claim 1, wherein the control circuit (4) is designed to detect a CCT and/or an intensity of a sensed light on a basis of at least two supplied sensing signals.

7. The system (1) according to claim 6, wherein the control circuit (4) is designed to control the current through the LED module (2) as a function of the detected CCT and/or intensity.

8. The system (1) according to claim 6, wherein the CCT is detected taking into account relative intensity values of the sensing signals.

9. The system (1) according to claim 1, wherein the system (1) is part of a luminaire.

10. The system (1) according to claim 6, wherein the control circuit (4) is designed to change the CCT and/or a spectrum emitted by the LED module (2).

11. The system (1) according to claim 1, wherein the control circuit (4) is functionally connected with a storage device (5) in which LED straylight values are stored and associated with at least one operation parameter for the LED module (2), the LED straylight values indicating a contribution of an LED emission on the sensing signals.

12. The system (1) according to claim 11, wherein the operation parameter is one or more of LED current, LED voltage and temperature.

13. A luminaire provided with an illumination system (1) according to claim 1.

14. A method for calibrating the illumination system (1) according to claim 1, wherein the control circuit (4) is designed to calculate a crosstalk calibration value, by detecting a contribution of a switching on or increasing of the current through the LED module (2) in a non-ambient light state, on a basis of supplied detection signals.

* * * * *